(12) United States Patent
Simard (10) Patent No.: US 11,072,083 B2
(45) Date of Patent: Jul. 27, 2021

(54) ADJUSTABLE FOOD CUTTER

(71) Applicant: Jo-Anne Simard, Terrebonne (CA)

(72) Inventor: Jo-Anne Simard, Terrebonne (CA)

( * ) Notice: Subject to any disclaimer, the term of this patent is extended or adjusted under 35 U.S.C. 154(b) by 0 days.

(21) Appl. No.: 16/150,361

(22) Filed: Oct. 3, 2018

(65) Prior Publication Data

US 2019/0105791 A1 Apr. 11, 2019

(30) Foreign Application Priority Data

Oct. 5, 2017 (GB) .................................. 1716333.8

(51) Int. Cl.
*B26D 3/24* (2006.01)
*A21C 15/04* (2006.01)
*A21C 11/00* (2006.01)

(52) U.S. Cl.
CPC ................ *B26D 3/24* (2013.01); *A21C 15/04* (2013.01); *A21C 11/006* (2013.01)

(58) Field of Classification Search
CPC .......... B26D 3/24; A21C 15/04; A21C 11/006
See application file for complete search history.

(56) References Cited

U.S. PATENT DOCUMENTS

| | | | | | |
|---|---|---|---|---|---|
| 1,520,711 | A | * | 12/1924 | Habart | A21C 11/106 30/304 |
| 2,063,327 | A | * | 12/1936 | Missiaen | B26D 3/24 30/114 |
| 2,571,465 | A | * | 10/1951 | McDevitt | B26B 3/04 30/114 |
| 2,878,564 | A | * | 3/1959 | Strate | A21C 11/14 30/303 |
| 2,986,815 | A | * | 6/1961 | Fernald | B26B 3/04 30/304 |
| 3,540,503 | A | * | 11/1970 | McNair | A47J 25/00 30/301 |
| 3,816,918 | A | * | 6/1974 | Brunty | A21C 5/00 30/114 |
| 3,888,001 | A | * | 6/1975 | Gilbart-Smith | A21C 15/04 30/114 |
| 4,100,676 | A | * | 7/1978 | Ferguson | A21C 15/04 269/295 |
| 4,589,206 | A | * | 5/1986 | Marcoux | A21C 15/04 30/114 |
| 4,625,404 | A | * | 12/1986 | Valente | A21C 11/106 30/114 |
| 5,799,401 | A | * | 9/1998 | Gering | B26D 3/06 30/113.2 |
| 5,848,470 | A | * | 12/1998 | Anderson | A21C 11/00 30/277 |
| 7,159,810 | B1 | * | 1/2007 | Miller | A47J 19/04 241/168 |

(Continued)

*Primary Examiner* — Omar Flores Sanchez (57) ABSTRACT

An adjustable food cutter that allows to cut food having a predetermined thickness into equal portions having a user selected cubic volume. The adjustable food cutter comprises a male cutter element and a female cutter element each having a U-shaped configuration oppositely slidably engaged relative to one another so as to form a telescopic cutter body. The adjustable food cutter further comprises a telescopic handle connected between opposed longitudinal end portions of an upper edge of the telescopic cutter body. The telescopic cutter body and the telescopic handle are cooperatively movable between a retracted and an extended position.

17 Claims, 5 Drawing Sheets

(56) References Cited

U.S. PATENT DOCUMENTS

| | | | | |
|---|---|---|---|---|
| 7,480,999 | B2 * | 1/2009 | Atwater | A21C 11/106 30/289 |
| 9,693,648 | B2 * | 7/2017 | Schwartz | A47J 43/28 |
| 2004/0211069 | A1 * | 10/2004 | Tuttle | A21C 15/04 30/302 |
| 2008/0209737 | A1 * | 9/2008 | Storms | B26B 3/04 30/114 |
| 2009/0193660 | A1 * | 8/2009 | Chen | A21C 15/04 30/114 |
| 2010/0263556 | A1 * | 10/2010 | Axinte | B26B 25/005 99/537 |
| 2012/0145581 | A1 * | 6/2012 | Parr | A21C 3/135 206/459.5 |
| 2012/0186409 | A1 * | 7/2012 | Baeten | A21C 15/04 83/13 |

\* cited by examiner

ADJUSTABLE FOOD CUTTER

FIELD OF THE INVENTION

The present invention relates generally to manual kitchen implements and, more particularly, to an adjustable utensil for cutting food such as lasagna, a cake or similar foods, into portions having each a user selected cubic volume.

BACKGROUND OF THE INVENTION

Manual kitchen implements such as food cutters and slicers are known. These known kitchen implements are generally represented by pie slicers, lasagna and cake cutting knives, and the well known cookie cutter sets used for shaping cookie dough into decorative shapes before baking.

These known kitchen implements generally have a fixed shape which prevents a user from selecting a predetermined custom size portion of food, or otherwise a precisely measured portion of food, such as is generally required by strict diet programs.

There are also known adjustable food cutters that are configured to allow a person to cut a custom size pie-shaped portion out of a circular pastry such as a typical round cake or pie. In some instances, these pie-shaped adjustable food cutters may include measurement indicia's to help adjust the two-dimensional size of the portion to be cut.

But even when these pie-shaped adjustable food cutters are provided with size indicia's for guiding the user, these food cutters still generally imply a relatively complex calculation including the Pi ($\pi$) constant, multiplication, and division with fraction numbers, in order to set the adjustable food cutter at a measured cubic volume. And performing these complex calculations, even with a calculator, is often more than enough to discourage any person who tries to stick to a rigorous diet program.

Thus there is a need in the industry for an improved adjustable food cutter that avoids the aforementioned disadvantages. In a broad aspect, the present invention provides such an improved adjustable food cutter.

SUMMARY OF THE INVENTION

In a broad aspect, the present invention provides an improved adjustable food cutter that allows to cut food having a predetermined thickness into equal portions having a user selected cubic volume. The present invention further provides an adjustable food cutter that is relatively easily disassembled after use for cleaning.

According to an embodiment of the present invention, the adjustable food cutter comprises a male cutter element and a female cutter element.

Each one of the male and female cutter elements has a substantially U-shaped configuration extending longitudinally. The male and female cutter elements each have the open ends of their respective U-shaped configuration oppositely slidably engaged relative to one another so as to form a longitudinally extendable telescopic cutter body.

The telescopic cutter body defines a cutter body upper edge, a cutter body lower edge, and a cutter body tubular passageway extending transversally throughout.

Furthermore, the telescopic cutter body is longitudinally movable between a retracted position and an extended position.

The adjustable food cutter further comprises a telescopic handle. The telescopic handle includes a pair of longitudinally spaced apart handle end portions and a handle telescopic portion extending longitudinally there between.

Each one of the handle end portions is connected to a respective longitudinal end portion of the cutter body upper edge.

The handle telescopic portion is cooperatively movable along with the telescopic cutter body between a handle retracted position and a handle extended position respectively.

Thus, the adjustable food cutter may have its telescopic cutter body user selectably adjusted to a desired length so as to cut food in a predetermined cubic volume.

As would be obvious to someone familiar with the general field of food cutters, the predetermined cubic volume of food to be cut using the adjustable food cutter of the present invention may be determined through the measurement of the cross-section defined by the cutter body tubular passageway and the thickness of the food to be cut.

Preferably, the cutter body lower edge defines a cutting edge and the cutter body tubular passageway has a square or rectangular cross-section.

Further preferably, each one of the male and female cutter elements is made of a substantially rigid sheet material extending between the cutter body lower edge and the cutter body upper edge. For example, the sheet material may be made of stainless steel, plastic, ceramic or a combination thereof.

In some embodiments of the present invention, the telescopic handle portion is length adjustable in incremental steps.

In some embodiments, the telescopic cutter body and the telescopic handle portion are each adapted for allowing a user to separate their telescopic assembly, so as to allow cleaning.

Other advantages, novel features and alternate embodiments of the present invention will be more apparent from the following drawings and

DETAILED DESCRIPTION OF THE INVENTION

FIGS. 1 to 19 inclusively illustrate various aspects of an embodiment, according to the present invention, of an adjustable food cutter 100.

Figure 1:
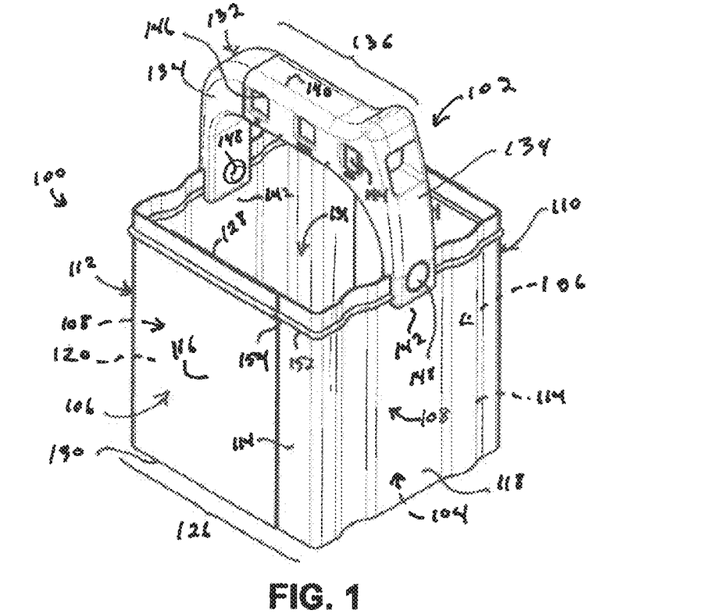
FIG. 1, in a top perspective view, illustrates an embodiment of an adjustable food cutter according to the present invention, here shown in a retracted state.

For orientation purposes, as illustrated in FIG. 1, the adjustable food cutter 100 generally defines a top end 102, a bottom end 104, distally oriented longitudinal ends 108 and lateral sides 106.

Figure 2:
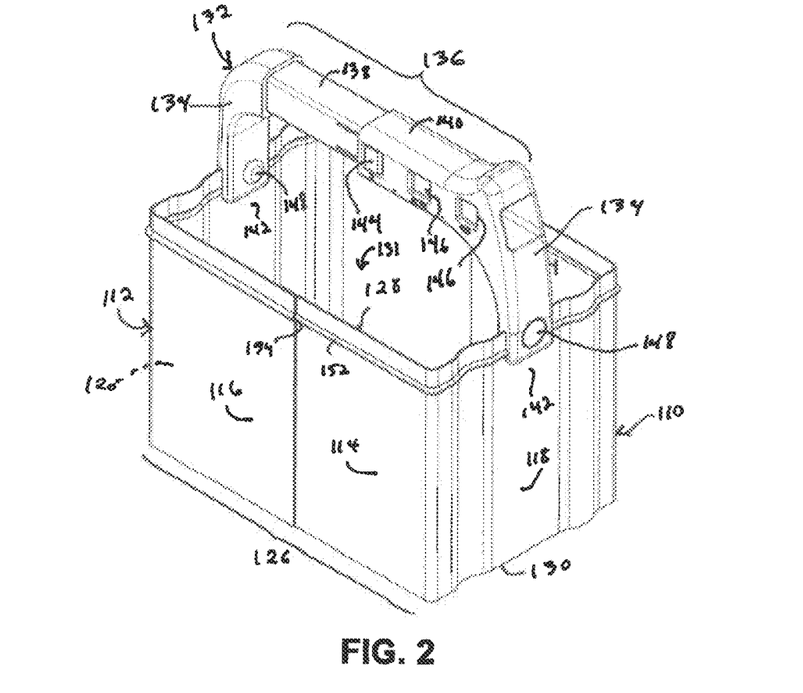
FIG. 2, in a top perspective view, illustrates the adjustable food cutter in FIG. 1, here shown in an extended state.
Figure 3:
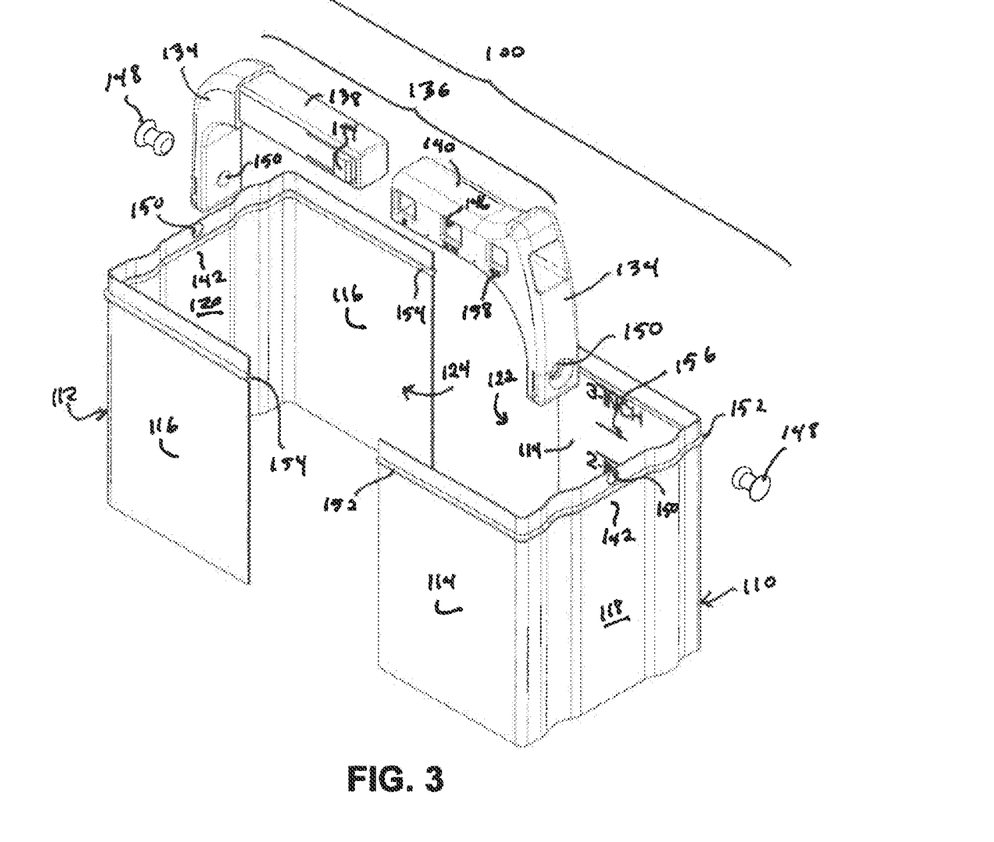
FIG. 3, in a top perspective, exploded view, illustrates the adjustable food cutter in FIG. 1.
Figure 4:
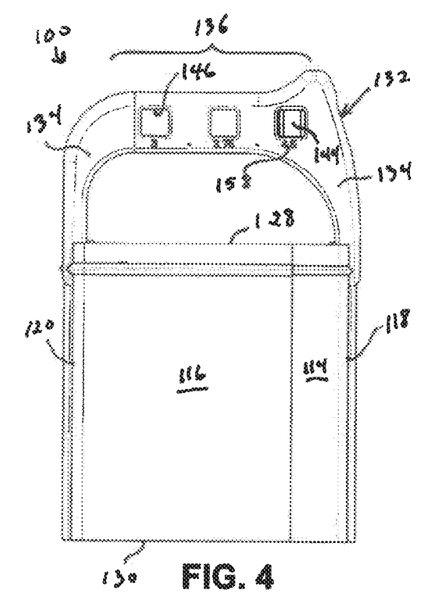
FIG. 4, in a side elevational view, illustrates the adjustable food cutter in FIG. 1, the opposite side elevational view being a mirror image thereof.
Figure 5:
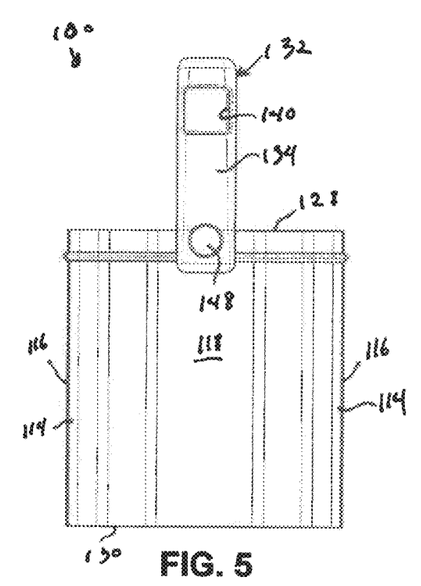
FIG. 5, in a longitudinal end elevational view, illustrates the adjustable food cutter in FIG. 1.
Figure 6:
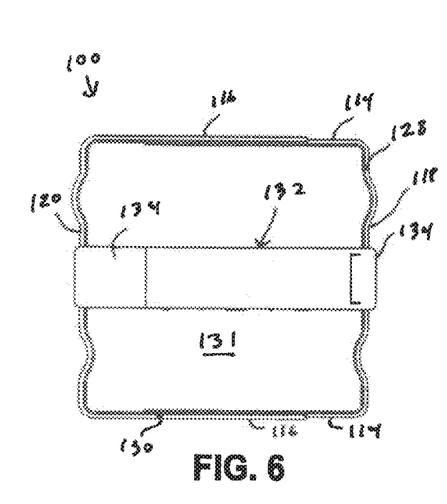
FIG. 6, in a top plan view, illustrates the adjustable food cutter in FIG. 1.
Figure 7:
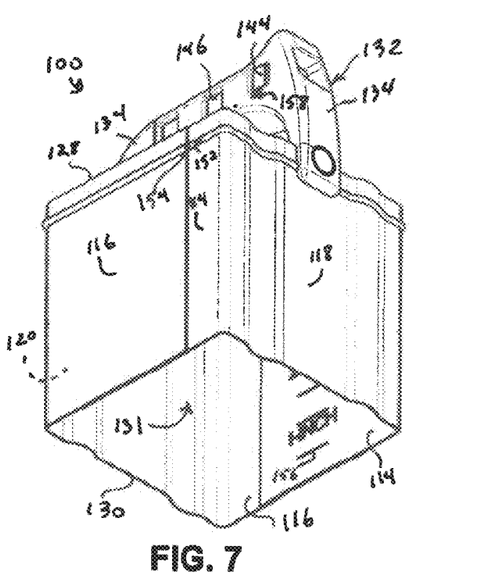
FIG. 7, in a bottom perspective view, illustrates the adjustable food cutter in FIG. 1.

Referring more particularly to FIGS. 1 to 3 inclusively, and 7 and 9, the adjustable food cutter 100 comprises a male cutter element 110 and a female cutter element 112.

Figure 9:
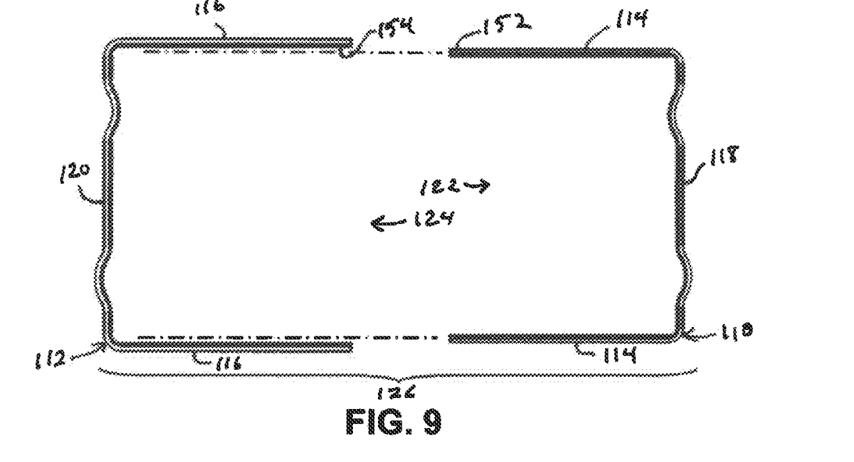
FIG. 9, in a top plan, exploded view, illustrate the telescopic cutter body in FIG. 8.
Figure 10:
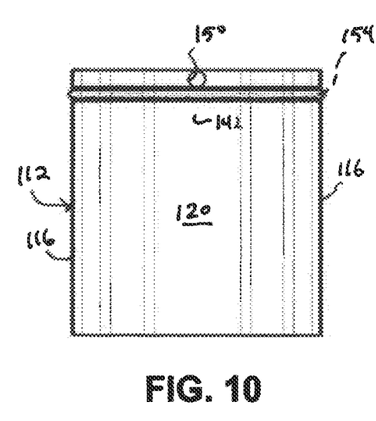
FIG. 10, in a longitudinal end, elevational view, illustrates a female cutter element.
Figure 11:
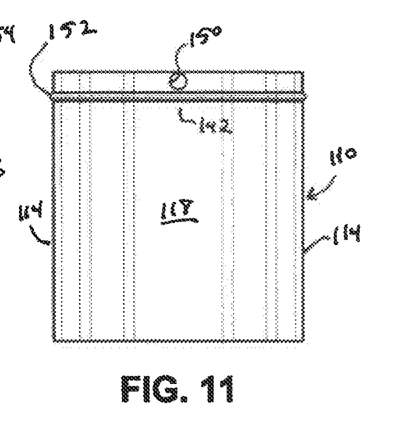
FIG. 11, in a longitudinal end, elevational view, illustrates a male cutter element.
Figure 12:
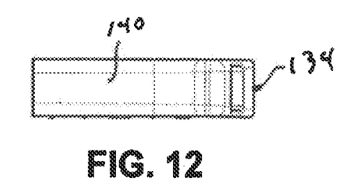
FIG. 12, in a top elevational view, illustrates a first handle element.
Figure 13:
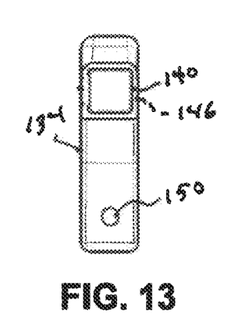
FIG. 13, in a first longitudinal end view, illustrates the first handle element in FIG. 13.
Figure 14:
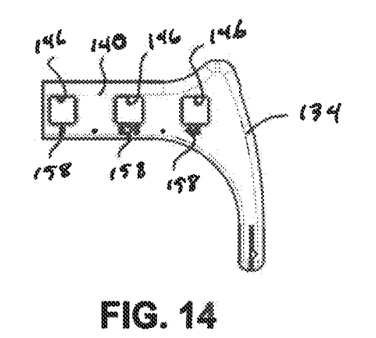
FIG. 14, in a side elevational view, illustrates the first handle element in FIG. 13.
Figure 15:
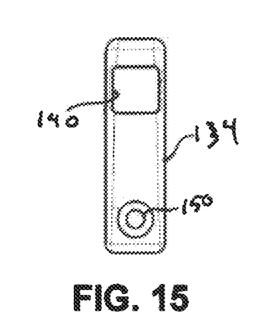
FIG. 15, in a second longitudinal end view, illustrates the first handle element in FIG. 13.
Figure 16:
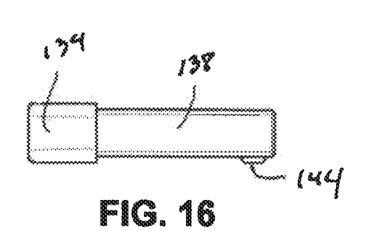
FIG. 16, in a top elevational view, illustrates a second handle element.
Figure 17:
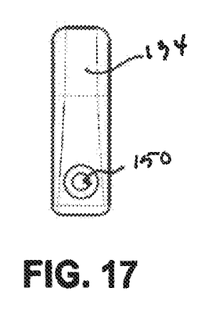
FIG. 17, in a first longitudinal end view, illustrates the second handle element in FIG. 13.
Figure 18:
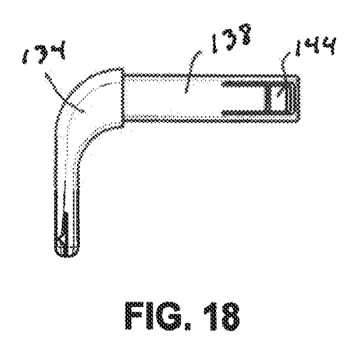
FIG. 18, in a side elevational view, illustrates the second handle element in FIG. 13.
Figure 19:
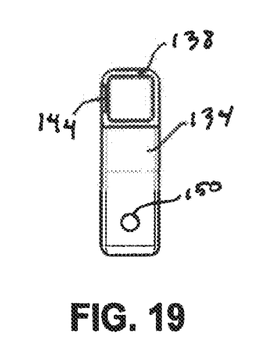
FIG. 19, in a second longitudinal end view, illustrates the second handle element in FIG. 13.

As best illustrated in FIG. 9, each one of the male and female cutter elements 110 and 112 has a substantially U-shaped configuration extending longitudinally.

The male and female cutter elements 110 and 112 each have the open ends 122 and 124 of their respective U-shaped configuration oppositely slidably engaged relative to one another so as to form a longitudinally extendable telescopic cutter body 126.

The telescopic cutter body 126 defines a cutter body upper edge 128, a cutter body lower edge 130, and a cutter body tubular passageway 131 extending transversally throughout.

Furthermore, the telescopic cutter body 126 is longitudinally movable between a retracted position, as illustrated in FIG. 1, and an extended position, as illustrated in FIG. 2.

The adjustable food cutter 100 further comprises a telescopic handle 132.

The telescopic handle 132 includes a pair of longitudinally spaced apart handle end portions 134 and a handle telescopic portion 136 extending longitudinally there between.

Each one of the handle end portions 134 is connected to a respective longitudinal end portion of the cutter body upper edge 128.

The handle telescopic portion 136 is cooperatively movable along with the telescopic cutter body 126 between a handle retracted position and a handle extended position, as illustrated in FIGS. 1 and 2 respectively.

Thus, the adjustable food cutter 100 may have its telescopic cutter body 126 user selectably adjusted to a desired length so as to cut food in a predetermined cubic volume.

As would be obvious to someone familiar with the general field of food cutters, the predetermined cubic volume of food to be cut using the adjustable food cutter 100 of the present invention may be determined through the measurement of the cross-section area defined by the cutter body tubular passageway 131 and the thickness of the food to be cut.

Furthermore, the adjustable food cutter 100 is preferably suitably dimensioned such that the telescopic handle portion 136 is at least slightly spaced apart above the thickness of the food to be cut once the telescopic cutter body 126 is fully pressed through the latter.

Preferably, the cutter body lower edge 130 defines a cutting edge.

As best illustrated in FIGS. 1, 2 and 6 and 7, further preferably, the cutter body tubular passageway 131 has a square or rectangular cross-section.

Typically, as exemplified in the drawings, the adjustable food cutter 100 is suitably configured and sized so as to have a telescopic cutter body 126 measuring about 3 inch in length and width (e.g. measuring 9 inch square in a horizontal cross-section) when in a retracted state, and 3 inch in width by 4.5 inch in length (e.g. a 13.5 square inch cross-section) when in an extended state. Furthermore, the telescopic cutter body 126 may have a height of 3 inch.

Figure 8:
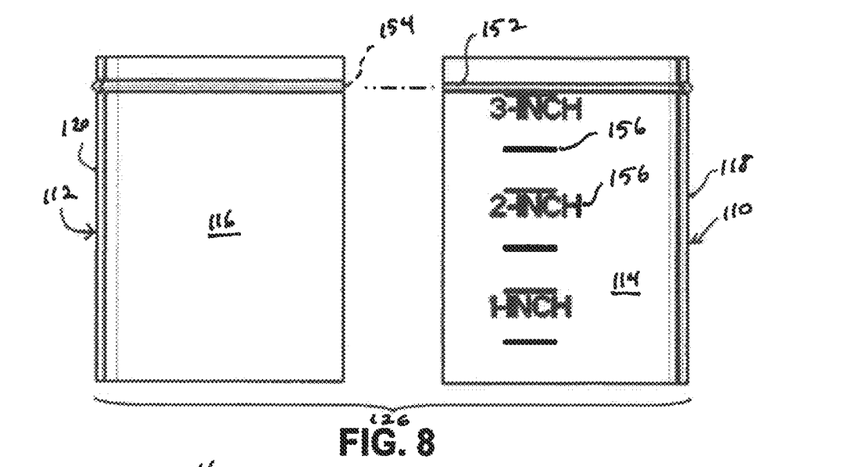
FIG. 8, in a side elevational, exploded view, illustrate a telescopic cutter body.

As best illustrated in FIG. 8, the adjustable food cutter 100 further preferably comprises height measurement indicia's 156 printed or embossed along at least one vertical surface portion of at least one of the male or female cutter elements 110 and 112.

As exemplified in the drawings, height measurement indicia's in half inches increments originating from the cutter body lower edge 130 may be printed and/or embossed in the surface.

Other values for the extended and retracted lengths dimensions and the fixed width and height dimensions are also possible for achieving other predetermined cubic volume of food per cut portions.

Further preferably, each one of the male and female cutter elements 110 and 112 is made of a substantially rigid sheet material extending between the cutter body lower edge 130 and the cutter body upper edge 128.

For example, the sheet material may be made of stainless steel, aluminum, plastic, ceramic or a combination thereof. Other types of substantially rigid sheet material are also possible.

Further preferably, the telescopic handle portion 136 extends longitudinally and parallelly centrally in a spaced apart relationship relative to the cutter body upper edge 128.

In some embodiments of the present invention, the telescopic handle portion 136 is length adjustable in incremental steps. As best exemplified through FIGS. 2 and 3, the telescopic handle portion 136 includes a longitudinally extending male member 138 slidably engaged in a tubular female member 140.

The male member 138 includes a spring biased button 144 extending laterally from a longitudinal side surface portion thereof. The tubular female member 140 defines a plurality of apertures 146 extending laterally through, and in a spaced apart relationship along, a longitudinal side surface thereof that is in register with the longitudinal side surface of the male member 138 provided with the spring biased button 144.

The spring biased button 144 and the plurality of apertures 146 are cooperatively configured and sized so as to allow a user to move the telescopic cutter body 136 in incremental steps between the retraced position and the extended position.

Furthermore, each incremental step corresponds to a predetermined cubic volume or weight of food to be cut having a predetermined thickness.

Preferably, an indicia 158 adjacent each aperture 146 indicates the area defined by the cross-section of the telescopic cutter body 126 so as to allow a user to relatively easily calculate the cubic volume of the food to be cut having a measured thickness dimension.

Alternatively, each indicia 158 may indicate a predetermined cubic volume or a weight in grams or ounces of the portion of food to be cut having a specific thickness.

Other known configurations for the spring biased button 144 and the plurality of apertures 146, for moving the telescopic handle portion 136 in incremental steps, are also possible.

Referring to FIGS. 7 to 11 inclusively, in some other embodiments of the present invention, each one of the male and female cutter elements 110 and 112 defines cooperatively shaped male and female grooves 152 and 154, respectively, that are extending along oppositely contacting longitudinal side surface portions thereof, for securing the relative longitudinal sliding movement of the male and female cutter elements 110 and 112.

As best illustrated in FIG. 3, in some embodiments, the telescopic cutter body 126 and the telescopic handle portion 136 are each adapted for allowing a user to separate their telescopic assembly, so as to allow cleaning.

Still referring to FIG. 3, in some embodiments, each handle end portion 134 is removably detachable from its respective male and female cutter elements 110 and 112, so as to allow an even more thorough cleaning.

As exemplified in FIG. 3, each handle end portion 134 is removably detachable through removable rivet-like attachment elements 148 extending through corresponding apertures 150 defined through the handle end portions 134 and corresponding longitudinal ends of the upper edge portion 142.

The removable rivet-like attachment elements 148 may be made of sufficiently stretchable resilient material such as a flexible silicone material or the like.

Other known removvable attachment configurations between the handle end portions 134 and the upper edge portion 142 are also possible.

Alternatively, each handle end portion 134 may be integrally formed with its corresponding upper edge portion 142.

A preferred mode of usage of the adjustable food cutter 100 will now be described for cutting into equal portions a layer of food having a substantially uniform thickness such as lasagna, a cake or the likes.

In a first step, a user extends or retracts the telescopic handle 132 at a user selected incremental step indicating a predetermined cross-section area of the telescopic cutter body 126.

In a second step, the user simply multiply the predetermined cross-section area of the telescopic cutter body 126 by the thickness of the food to be cut to obtain the cubic volume of food of each portion that will be cut.

In a third step, once the adjustable food cutter 100 is thus suitably adjusted, the user may then proceed with cutting one or more equal portions of food by pressing down the cutter body lower edge 130 through the food.

Although the above description contains many specificities, these should not be construed as limitations on the scope of the invention but is merely representative of the presently preferred embodiments of this invention.

What is claimed is:

1. An adjustable food cutter, comprising:
   a male cutter element and a female cutter element,
      each one of the male and female cutter elements has a substantially U-shaped configuration extending longitudinally, and
      the male and female cutter elements each have the open ends of their respective U-shaped configuration oppositely slidably engaged relative to one another so as to form a longitudinally extendable telescopic cutter body,
      wherein the telescopic cutter body defines a cutter body upper edge, a cutter body lower edge, and a cutter body tubular passageway extending transversally throughout, and
      wherein the telescopic cutter body is longitudinally movable between a retracted position and an extended position; and
   a telescopic handle,
      the telescopic handle includes a pair of longitudinally spaced apart handle end portions and a handle telescopic portion extending longitudinally there between,
      each one of the handle end portions is connected to a respective longitudinal end portion of the cutter body upper edge,
      wherein the handle telescopic portion is cooperatively movable along with the telescopic cutter body between a handle retracted position and a handle extended position;
   whereby, the adjustable food cutter may have its telescopic cutter body user selectably adjusted to a desired length so as to cut food in a predetermined cubic volume.

2. The adjustable food cutter according to claim 1, wherein the cutter body lower edge defines a cutting edge.

3. The adjustable food cutter according to claim 1, wherein each one of the male and female cutter elements is made of a substantially rigid sheet material extending between the cutter body lower edge and the cutter body upper edge.

4. The adjustable food cutter according to claim 3, wherein the sheet material is made of stainless steel, plastic, ceramic or a combination thereof.

5. The adjustable food cutter according to claim 1, wherein the telescopic handle portion is length adjustable in incremental steps.

6. The adjustable food cutter according to claim 5, wherein
   the telescopic handle portion includes a longitudinally extending male member slidably engaged in a tubular female member,
   the male member includes a spring biased button extending laterally from a longitudinal side surface portion thereof,
   the tubular female member defines a plurality of apertures extending laterally through, and in a spaced apart relationship along, a longitudinal side surface thereof that is in register with the longitudinal side surface of the male member provided with the spring biased button,
   wherein the button and the plurality of apertures are cooperatively configured and sized so as to allow a user to move the telescopic cutter body in incremental steps between the retraced position and the extended position,
   wherein each incremental step corresponds to a predetermined cubic volume or weight of food to be cut having a predetermined thickness.

7. The adjustable food cutter according to claim 1, wherein each one of the male and female cutter elements defines cooperatively shaped male and female grooves extending along oppositely contacting longitudinal side surface portions, for securing the relative longitudinal sliding movement of the male and female cutter elements.

8. The adjustable food cutter according to claim 1, wherein the telescopic cutter body and the telescopic handle portion are each adapted for allowing a user to separate their telescopic assembly, so as to allow cleaning.

9. The adjustable food cutter according to claim 1, wherein each handle end portion is removably detachable from its respective male and female cutter elements, so as to allow cleaning.

10. The adjustable food cutter according to claim 1, wherein the cutter body tubular passageway has a square or rectangular cross-section.

11. The adjustable food cutter according to claim 1, wherein the telescopic handle portion extends longitudinally and parallelly centrally in a spaced apart relationship relative to the cutter body upper edge.

12. An adjustable food cutter, comprising:
a male cutter element and a female cutter element,
  each one of the male and female cutter elements has a substantially U-shaped configuration extending longitudinally and is made of a substantially rigid sheet material, and
  the male and female cutter elements each have the open ends of their respective U-shaped configuration oppositely slidably engaged relative to one another so as to form a longitudinally extendable telescopic cutter body,
  wherein the telescopic cutter body defines a cutter body upper edge, a cutter body lower edge, and a cutter body tubular passageway extending transversally throughout,
  wherein the cutter body tubular passageway has a square or rectangular cross-section and the cutter body lower edge defines a cutting edge, and
  wherein the telescopic cutter body is longitudinally movable between a retracted position and an extended position; and
a telescopic handle,
  the telescopic handle includes a pair of longitudinally spaced apart handle end portions and a handle telescopic portion extending longitudinally there between,
  each one of the handle end portions is connected to a respective longitudinal end portion of the cutter body upper edge,
  wherein the handle telescopic portion is cooperatively movable along with the telescopic cutter body,
  wherein the telescopic handle portion is length adjustable in incremental steps between a handle retracted position and a handle extended position;
  whereby, the adjustable food cutter may have its telescopic cutter body user selectably adjusted to a desired length so as to cut food in a predetermined cubic volume.

13. The adjustable food cutter according to claim 12, wherein the sheet material is made of stainless steel, plastic, ceramic or a combination thereof.

14. The adjustable food cutter according to claim 12, wherein
  the telescopic handle portion includes a longitudinally extending male member slidably engaged in a tubular female member,
  the male member includes a spring biased button extending laterally from a longitudinal side surface portion thereof,
  the tubular female member defines a plurality of apertures extending laterally through, and in a spaced apart relationship along, a longitudinal side surface thereof that is in register with the longitudinal side surface of the male member provided with the spring biased button,
  wherein the button and the plurality of apertures are cooperatively configured and sized so as to allow a user to move the telescopic cutter body in incremental step between the retraced position and the extended position,
  wherein each incremental step corresponds to a predetermined cubic volume or weight of food to be cut having a predetermined thickness.

15. The adjustable food cutter according to claim 12, wherein each one of the male and female cutter elements defines cooperatively shaped male and female grooves extending along oppositely contacting longitudinal side surface portions, for securing the relative longitudinal sliding movement of the male and female cutter elements.

16. The adjustable food cutter according to claim 1, wherein
  the telescopic cutter body and the telescopic handle portion are each adapted for allowing a user to separate their telescopic assembly, and
  each handle end portion is removably detachable from its respective male and female cutter elements,
  whereby the adjustable food cutter is thoroughly washable.

17. The adjustable food cutter according to claim 1, wherein the telescopic handle portion extends longitudinally and parallelly centrally in a spaced apart relationship relative to the cutter body upper edge.

* * * * *